United States Patent [19]
Law

[11] Patent Number: 6,091,425
[45] Date of Patent: Jul. 18, 2000

[54] CONSTANT MULTISAMPLE IMAGE COVERAGE MASK

[75] Inventor: Patrick Y. Law, Milpitas, Calif.

[73] Assignee: Silicon Graphics, Inc., Mountain View, Calif.

[21] Appl. No.: 09/024,828

[22] Filed: Feb. 17, 1998

[51] Int. Cl.[7] .................................................. G06F 15/00
[52] U.S. Cl. ............................................................ 345/433
[58] Field of Search .................................... 345/433, 418, 345/440, 441, 429, 132

[56] References Cited

U.S. PATENT DOCUMENTS 5,268,992  12/1993  Sasaki ........................................ 395/110
5,369,739  11/1994  Akeley ....................................... 395/134

Primary Examiner—Phu K. Nguyen
Attorney, Agent, or Firm—Wagner, Murabito & Hao LLP

[57] ABSTRACT

In a computer, a graphics system and process for generating a multisample image coverage mask comprising a constant number of samples. The mask covers an array of pixels with each pixel containing a number of samples. The samples are associated with information regarding the image which is used by the computer graphics system to render the image on a pixel. The samples utilized in creating the mask are those closest to the center of an image.

20 Claims, 11 Drawing Sheets

| 7 Bits | 5 Bits | 5 Bits | 5 Bits | 5 Bits | 5 Bits | 5 Bits | 5 Bits |

CONSTANT MULTISAMPLE IMAGE COVERAGE MASK

FIELD OF THE INVENTION

The present invention pertains to the field of computer graphics systems. More particularly, the present invention relates to a computer graphics system and process for generating a constant multisample image coverage mask.

BACKGROUND OF THE INVENTION

Computer systems typically have some method of interfacing with users. Often, this interfacing involves the graphical representation of images (graphics) on a display screen, other visualization device or a hard copy printout. Graphics are generated by computer graphics systems that simulate and display images of real or abstract objects. Graphics enable a user to visualize and comprehend the configuration of a single object or the interaction and relationships between a group of objects. The images usually comprise pictures in which the objects remain still, or video displays in which the objects move. Most modern computer graphics systems are interactive, permitting a user to input changes to a display or modify the images on the fly. Computer graphics are used to perform a wide variety of tasks and have become a key technology for communicating ideas, data, and trends in most areas of business, science, education and entertainment.

In most computer graphic systems an image is represented as a raster (an array) of logical picture elements (pixels). A pixel is usually a rectangle, but can be other shapes. The computer graphics system assigns parameter values to each pixel. These parameter values are digital values corresponding to certain attributes of the image (e.g. color, depth, etc.) measured over a small area of the image represented by a pixel. Typically each graphical image is represented by thousands of combined pixels.

In a complex or three dimensional (3D) computer generated graphical image, objects are typically described by graphics data models. These coverage masks typically define the shape of the object, the object's attributes, and where the object is positioned. The shape of the object is normally described in terms of "primitives", which usually comprise mathematically described circular disks, vectors, polygons or polyhedra. In order to simplify very complex models the primitives are broken down into small pieces called fragments. Each fragment must be the size of a pixel or smaller.

FIG. 1 shows a schematic of one embodiment of a computer graphics system 100. Computer graphics system 100 comprises a central processing unit (CPU) 101, a main memory 102, graphics controller 103, frame buffer 104, mass storage device 105, keyboard controller 106, keyboard 108, printer 109 and display monitor 110, all of which are coupled to bus 107. CPU 101 handles most of the control and data processing. Main memory 102 provides a convenient method of storing data for quick retrieval by CPU 101. Graphics controller 103 processes image data in pipelined stages. Frame buffer 104 stores pixel parameter values. Mass storage device 105 stores data associated with multiple images and applications. Keyboard controller 106 controls keyboard 108, which operates as an input device. Printer 109 prints hard copies of graphical images and display monitor 110 displays graphical images.

The objective of most computer graphics systems is to create a graphical image. This usually begins with inputting data and instructions on an input device (e.g. keyboard 108). A CPU (e.g. CPU 101) interprets the instructions and image data in order to perform the appropriate processing. Some computer graphics systems may include special-purpose processors, each custom tailored to specific graphics functions. The main graphical processing function of the CPU (or special-purpose processors) is to take the specifications of graphical primitives specified by application programs and to assign pixels a parameter value or values that best represent characteristics of an image.

Parameter values are stored in frame buffers which typically are implemented in special types of memory chips, such as video random access memory (VRAM) or dynamic random access memory (DRAM). These special memory chips permit fast redisplay of the contents of the frame buffer. The resolution and detail of the image are largely determined by the number of pixels in the frame buffer. The number of bits that are used for each pixel defines the depth of the frame buffer and determines properties such as how many colors can be represented on a given system. For example, a 1-bit-deep frame buffer allows only two colors. Frame buffers play an important role in rasterization.

Rasterization is the process of assigning a pixel a parameter value in the frame buffer for particular primitives. Rasterization can proceed on a pixel basis or primitive basis. The first step in a rasterization process is to determine which pixels are to be updated in rendering a particular primitive, usually by establishing a bounding box. The next step involves the determination of how those pixels should be updated and what parameter values should be assigned to a pixel for creating a visually accurate display.

One of the most effective ways to select each pixel's parameter values is known as multisampling or supersampling. Multisampling "measures" parameter values at a number of sample circular disks located in each pixel. In most computer graphics systems, multisampling actually involves reconstructing a signal and sampling the reconstructed signal. The number of samples per pixel may vary from application to application. Typically each pixel has eight sample circular disks.

Despite being one of the most effect ways to draw images, prior art multisampling processes produced some undesirable results. Prior art multisample processes were relatively slow and displayed other problems, such as flickering due to the number of samples not remaining constant. For example, if a image of a light circular disk was being displayed from the perspective of a moving airplane, the location of the light on a monitor moves and if the number of samples are not kept constant the light intensity changes causing the light to flicker. In addition, prior art multisample processes did not analyze samples in a manner that provided the best definition, for example, circular disks were sometimes skewed and not necessarily round. Previous multisampling processes require very large frame buffers to store attributes for all the samples. This is true even for comparatively simple images, such as a circular disk.

Thus, there is a need for a multisample process which is inexpensive to implement, yet highly effective. Optimally, a computer graphics system should provide excellent image quality while minimizing software and hardware requirements. Images should have good definition and should not appear to flicker. The solution should use less memory than prior art multisample processes and operates at a faster rate.

SUMMARY OF THE INVENTION

The present invention is a computer graphics system and process for analyzing and drawing a constant multisample image coverage mask. The present invention is a computer graphics system that provides excellent image quality while minimizing software and hardware requirements. It utilizes a multisample image method which is inexpensive to implement, yet highly effective. The present computer graphics multisample image process uses less memory than prior art "multisample" processes and operates at a faster rate. The present invention maintains a constant number of samples closest to the center in the images it renders. This minimizes the adverse appearance of flickering and produces images that have good definition.

In one embodiment the present invention comprises a computer graphics system for generating a multisample image coverage mask of a circular disk comprising a constant number of samples. The multisample image coverage mask covers an array of pixels with each pixel containing a number of samples. The present embodiment utilizes a look up table to indicate the number of samples in a given fragment of a multisample image coverage mask. The look up table utilizes data compression techniques that take advantage of the symmetrical arrangement of potential center locations in a pixel. The samples are associated with information regarding the image (e.g. color, depth, etc.) which is used by the computer graphics system to render the image on a grid of pixels.

The process and system of the present embodiment ensures samples utilized in creating the multisample image coverage mask are those closest to the center of the multisample image coverage mask. The present embodiment determines the distance from the samples to the center of a circular disk image and then utilizes a network of sorting nodes to sort the results in a list according to ascending magnitude of distance. The determination of the distance from the samples to the center of a circular disk image and the sorting of the results are implemented in hardware. This hardware implementation of the present embodiment permits the computer graphics system to operate faster, requires less memory, and renders better images than prior art.

DESCRIPTION OF THE DRAWINGS

The accompanying drawings which are incorporated in and form a part of this specification, illustrate embodiments of the invention and together with the description, serve to explain the principles of the invention.

BEST MODE FOR CARRYING OUT THE INVENTION

Reference will now be made in detail to the preferred embodiments of the invention, a computer graphics system and process for analyzing and drawing a constant multisample image coverage mask, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a computer graphics system and process for analyzing and drawing a constant multisample image coverage mask. It utilizes a constant multisample image process which is inexpensive to implement, yet highly effective at providing excellent image quality while minimizing software and hardware requirements. The present computer graphics multisample image process uses less memory than prior art "multisample" processes and operates at a faster rate. The present invention produces images that have good definition, maintains a constant number of samples and minimizes the appearance of flickering.

Figure 1:
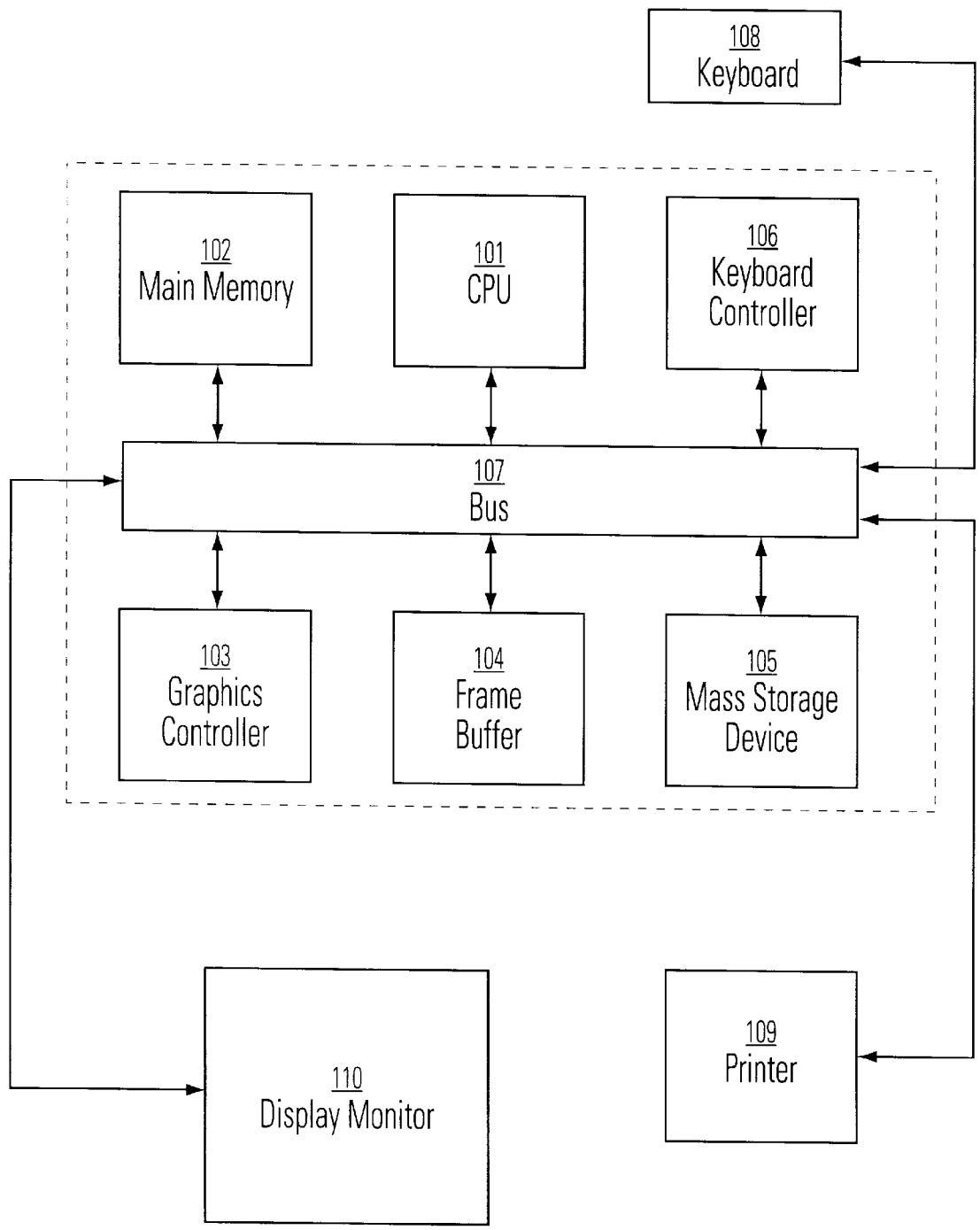
FIG. 1 shows a typical computer graphics system of the prior art.
Figure 2A:
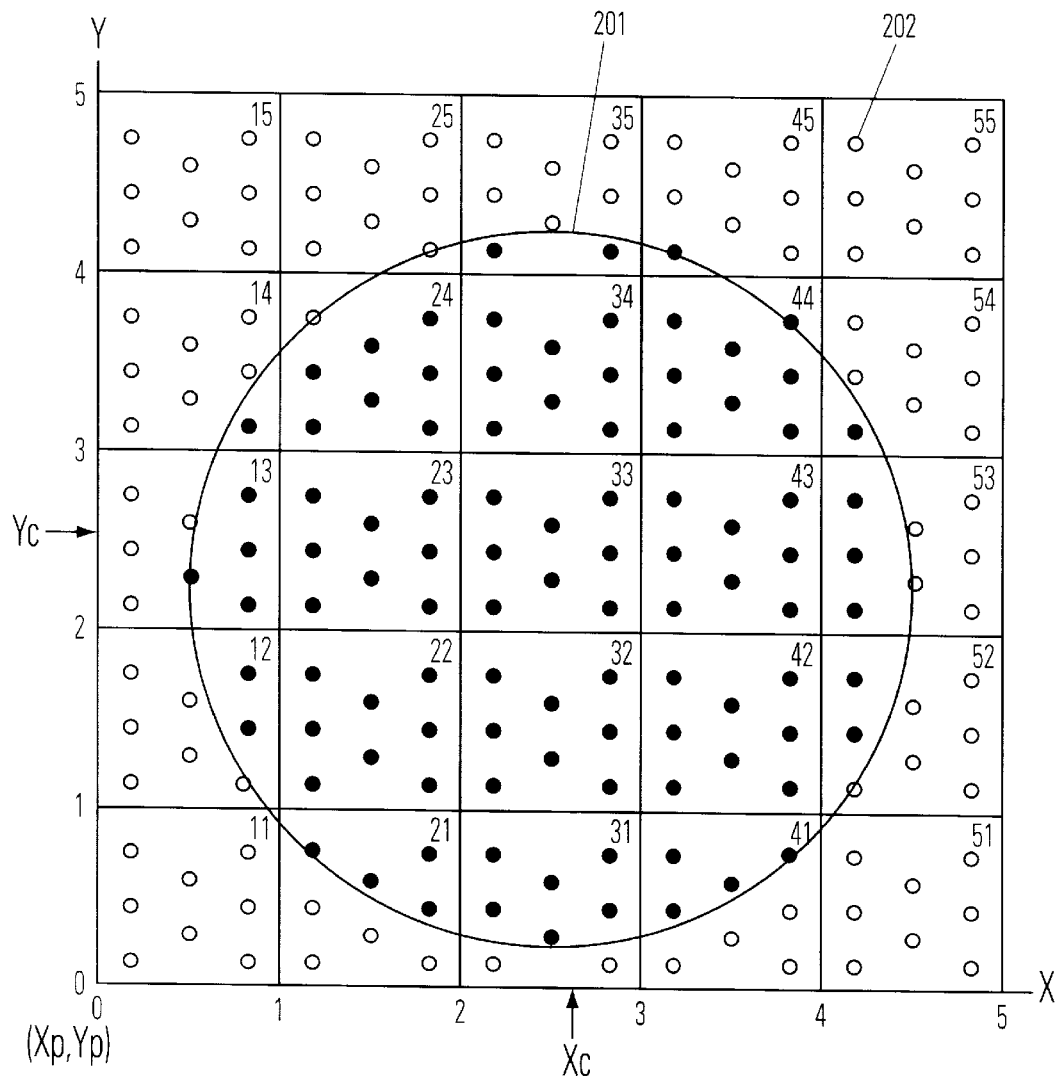
FIG. 2A is an illustration of a constant multisample circular disk 201 drawn on a five by five grid of pixels.

In one embodiment of the present invention a computer graphics system is utilized to draw a constant multisample image comprising a circular disk on a grid of rectangular pixels. For example, FIG. 2A shows one representation of a circular disk 201 drawn on a five by five grid of pixels 11 through 55. The five by five grid is overlaid on a XY coordinate system in which X is shown on a horizontal axis and Y is shown on a vertical axis. The center of circular disk 201 is located at coordinate (Xc,Yc).

Figure 2B:
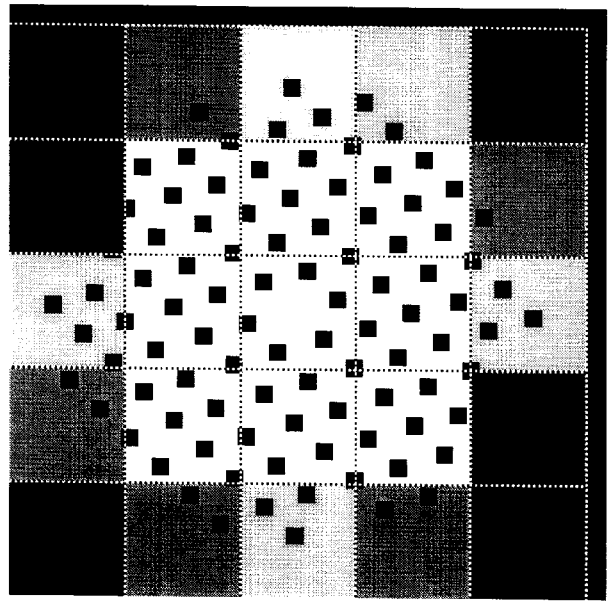
FIG. 2B is a representation of a 100 sample constant multisample circular disk.
Figure 2C:
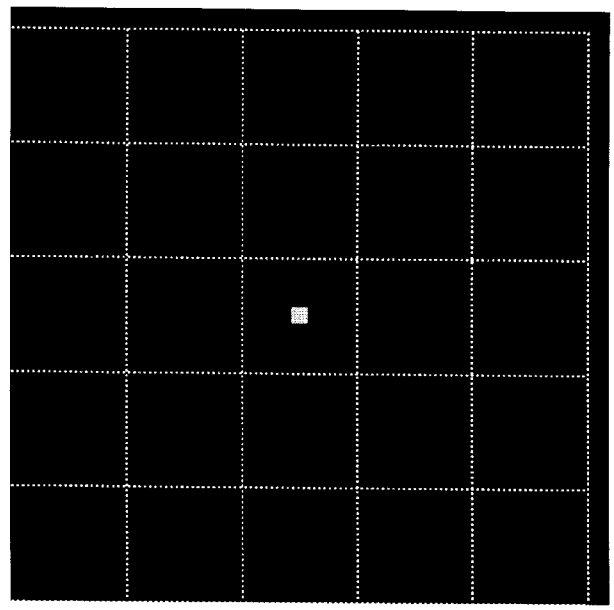
FIG. 2C is a representation of a 1 sample constant multisample circular disk.

The present embodiment employs a multisampling technique to draw a circular disk. The multisampling technique permits more than one sample 202 per pixel of an image's attributes. Although only one sampling pattern is shown in FIG. 2A, the present embodiment includes a number of different sampling patterns. Other sampling patterns are not shown in FIG. 2 so as not to unnecessarily obscure the invention. The maximum number of samples per pixel and the maximum samples per image is programmable. In the present embodiment there are a maximum of eight samples per pixel and a maximum of one hundred samples per circular disk. The number of samples in the circular disk is determined by the size of a circular disk. For example FIG. 2B shows a representation of a 100 sample circular disk and FIG. 2C shows a representation of al sample circular disk.

The relationship of the number of samples in a circular disk to the circular disk size in pixels is determined by the following formula:

$$(TS) = \pi r^2 (MSP)$$

where r is the radius of the circular disk expressed in pixels, (TS) is the total number of samples in circular disk and (MSP) is the maximum number of samples within a pixel. The maximum number of samples within a pixel and $\pi$ are constant. Thus, as size of a circular disk increases, the total number of samples in it also increases. In the present embodiment the maximum diameter of the circular disk image is 4 pixels (radius of 2 pixels) and maximum number of samples within a pixel is 8. Solving for the total number of samples in a circular disk (TS) indicates the maximum number of samples within a circular disk is 100. Once the number of samples in a circular disk is determined the location of the circular disk's center around which the samples are to be drawn must be established.

Figure 3A:
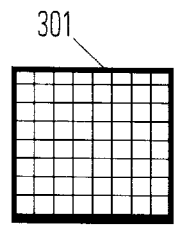
FIG. 3A is an illustration of a single pixel 301 divided into 64 potential center positions.

Theoretically there are an infinite number of potential positions for the center of a constant multisample image to occupy. However, it would not be practical to maintain an infinite number of look up tables. Since there are potentially a maximum of 8 samples in any given pixel, the granularity of the pixel is $2^{-3}$ and resolution is 1/8 of a pixel. Given that the pixel resolution is 1/8, the present invention divides a pixel by 8in each direction resulting in 64 potential center positions of a constant multisample image. This is illustrated in FIG. 3A showing a single pixel 301 divided into 64 potential center positions. Once the center and size are available the present embodiment can process the information and draw a circular disk.

In order to draw a circular disk, the present embodiment must ascertain which pixels contain fragments of the circular disk. The present embodiment determines which pixels are involved by establishing a bounding box. By definition a bounding box must be large enough to include all the pixels that contain fragments of the circular disk. Thus, the minimum size of the bounding box is determined by the size of a circular disk. Since the diameter of the circular disk in the present embodiment is 4 pixels, as a practical matter the bounding box must be a 5 by 5 pixel bounding box.

In FIG. 2A the center (Xc,Yc) of circular disk 201 does not fall exactly at the intersection of 4 pixels. It is apparent that the fragments on the perimeter of the circular disk only partially cover the pixels at the outer circumference of the circular disk (pixels 35, 45, 44, 54, 53, etc.). Therefore, the bounding box of the present embodiment must be at least a five by five pixel box in order to include all the fragments of the circular disk. After determining the size of the bounding box it is necessary to determine where to draw it.

Figure 3B:
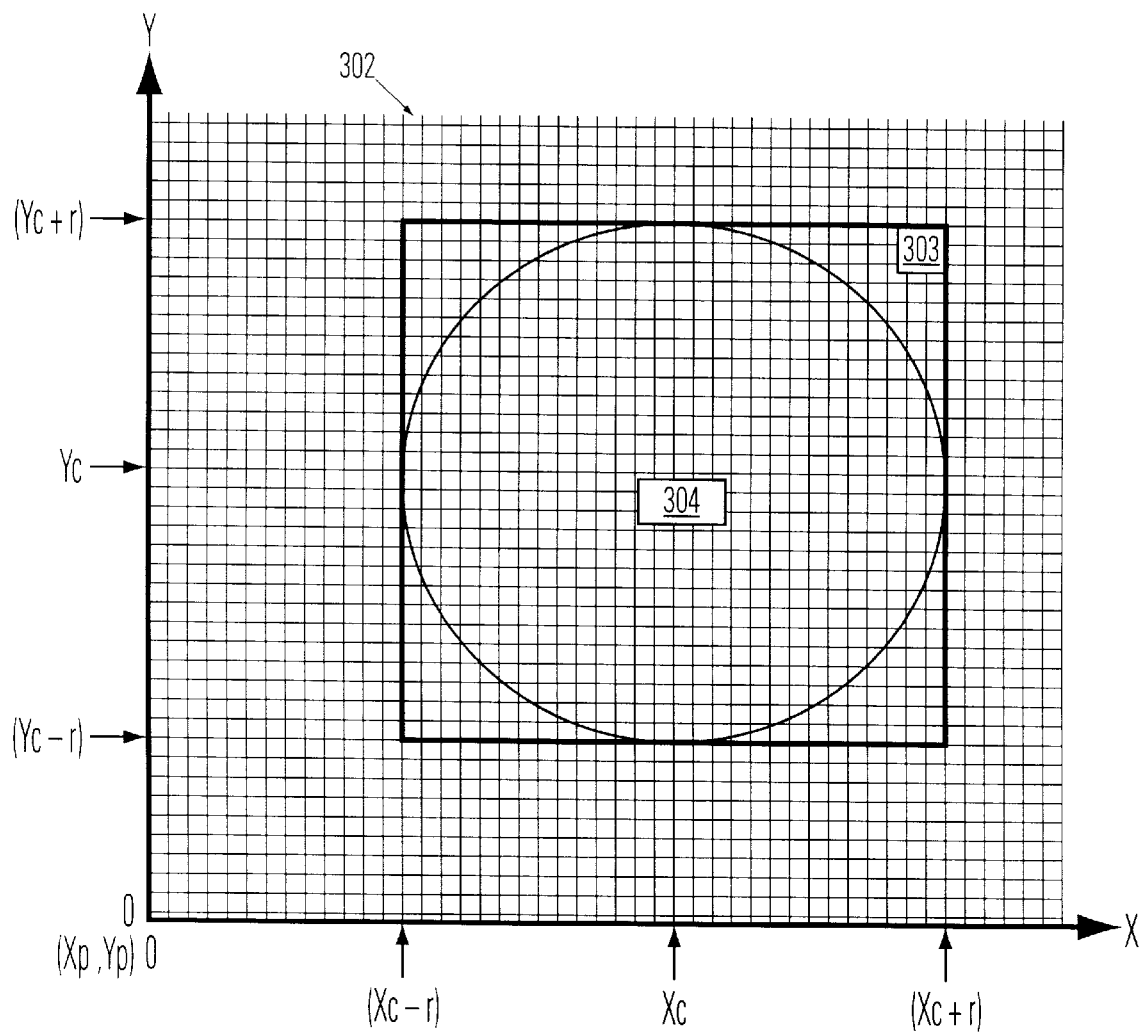
FIG. 3B is an illustration of a bounding box 303 and circular disk 304 drawn on a 47 by 42 pixel grid 302.

In the present embodiment, the center of a bounding box is also the center (Xc,Yc) of circular disk 201, a constant multisample image. In another embodiment shown in FIG. 3B, the 47 by 42 pixel grid 302 is much larger than 5 by 5 pixel grid shown in FIG. 2A and the bounding box 303 and circular disk 304 also contain more pixels than the present embodiment. The edges of the bounding box 303 do not rest on the coordinate axes and are defined by points (Xc−r, Yc−r), (Xc−r, Yc+r), (Xc+r, Yc+r) and (Xc+r, Yc−r). In some instances it is desirable to have the edges of the bounding box rest on coordinate axes as shown in FIG. 2A.

There are well known techniques in the art that permit transformations between implementations in which the bounding box edges rest on coordinate axes and implementations in which they do not. Once the bounding box and pixels involved are established, an analysis of the samples within those pixels must be performed.

The best image is realized if the samples within a pixel closest to the circular disk center are analyzed. For example, in the present embodiment if samples closest to the center of a circular disk are analyzed it will produce the roundest circular disk. In order to determine which samples are closest to the center of the circular disk, the distance of the samples from the circular disk's center must be determined.

Figure 4:
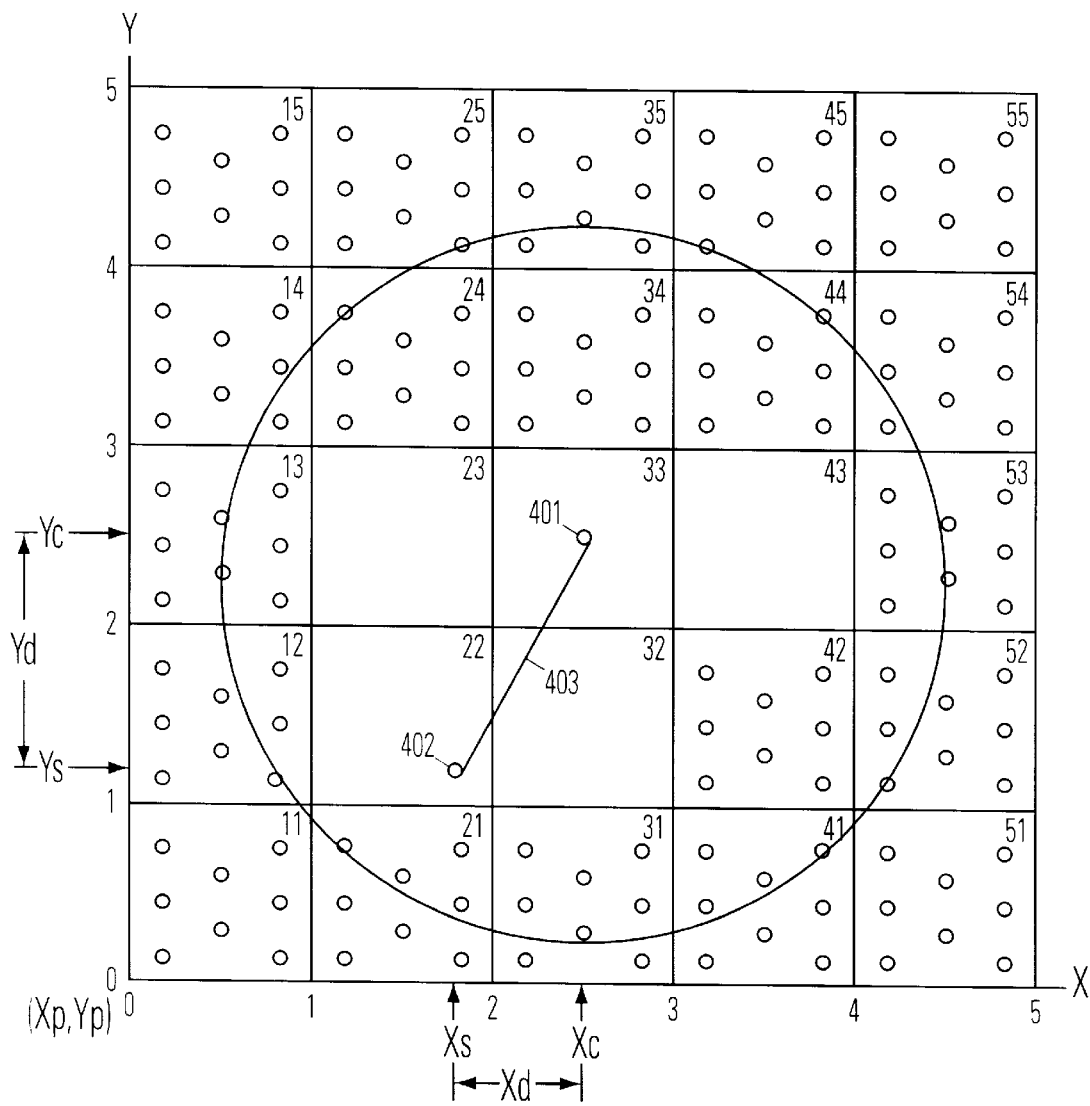
FIG. 4 shows the distance relationship between an arbitrary sample 401 at coordinate (Xs,Ys) and circular disk center 402 at coordinate (Xc,Yc).

FIG. 4 shows the distance relationship between an arbitrary sample 401 at coordinate (Xs,Ys) and circular disk center 402 at coordinate (Xc,Yc). The true straight line distance 403 of sample 401 from the circular disk center 402 is given by the formula:

$$Dt^2 = Xd^2 + Yd^2$$

where Dt equals the true straight line distance of the sample from the center of the circular disk, Xd equals the distance component measured parallel to the horizontal axis and Yd equals the distance component measured parallel to the vertical axis. The present invention achieves the most accurate results when the true straight line distance calculation is utilized. There are distance determination components capable of calculating the true straight line distance. However, implementing the true straight line calculation in an electronic device is relatively complex and expensive, especially when the calculation is duplicated for each sample in a pixel.

There are less complex and less expensive distance determination components that reliably approximate the straight line distance of a sample from the center of a circular disk without appreciably diminishing image definition. In the present embodiment the following formula is utilized to approximate the straight line distance 403 of sample 402 from the circular disk center 401:

$$Da = |Xd| + |Yd| - 0.5Z$$

where Da equals an approximation of the true straight line distance 403 of the sample 402 from the circular disk center 401, Xd equals the distance component measured parallel to the horizontal axis, Yd equals the distance measured parallel to the vertical axis and Z equals the minimum (|Xd|, |Yd|).

Figure 5:
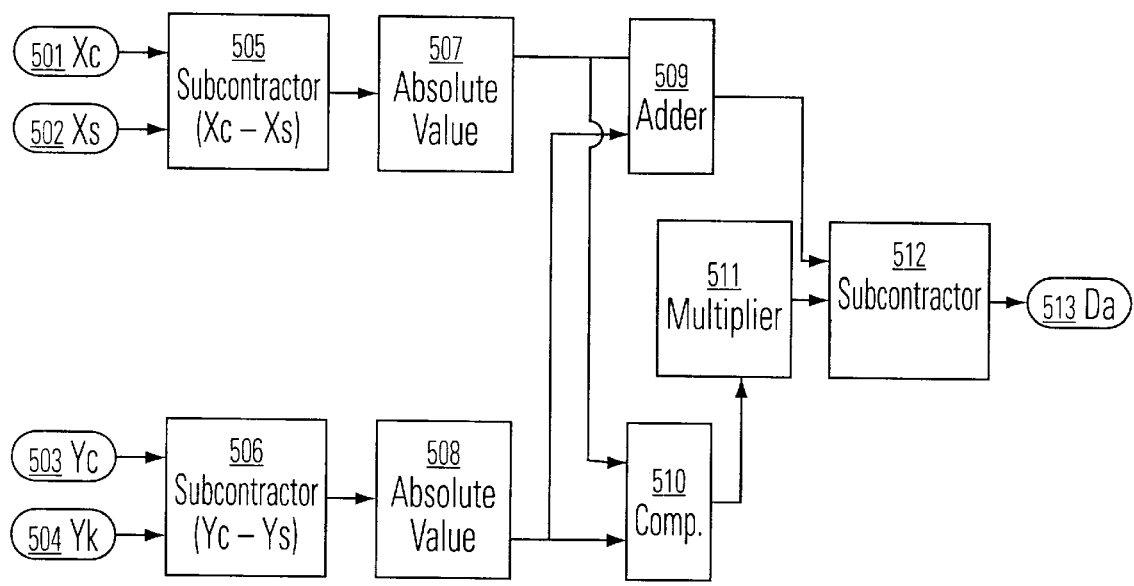
FIG. 5 is a schematic diagram of one embodiment of a sample distance determination component 500.

FIG. 5 shows a schematic diagram of one embodiment of a sample distance determination component 500. Sample distance determination component 500 comprises circular disk center horizontal component Xc input 501, sample position horizontal component Xs input 502, circular disk center vertical component Yc input 503, sample position vertical component Ys input 504, horizontal input subtractor component 505, vertical input subtractor component 506, horizontal absolute value component 507, vertical absolute value component 508, adder component 509, absolute value comparator 510, minimum multiplier component 511, absolute minimum subtractor component 512 and distance approximation Da output 513.

The horizontal component of the circular disk center (Xc) and the horizontal component of the sample position (Xs) are fed into horizontal input subtractor component 505 on inputs 501 and 502. Horizontal input subtractor component 505 subtracts Xc 501 from Xs 502 resulting in a value Xd. The value Xd is fed into absolute value component 507 which determines |Xd|, the absolute value of Xd.

The vertical component of the circular disk center (Yc) and the vertical component of the sample position (Ys) are fed into vertical input subtractor component 506 on inputs 503 and 504. Vertical input subtractor component 506 subtracts Yc from Ys resulting in a value Yd. The value Yd is fed into absolute value component 508 which determines |Yd|, the absolute value of Yd.

The absolute values |Xd| and |Yd| are fed into adder component 509, and comparator component 510. Adder component 509 adds |Xd| and |Yd| and the total is fed into subtractor component 512. Comparator component 510 compares |Xd| and |Yd| and forwards Z, the minimum of (|Xd|, |Yd|), to minimum multiplier component 511. Minimum multiplier component 511 multiplies Z (the minimum of |Xd| and |Yd|) by 0.5 and feeds the result into absolute minimum subtractor 512. In the present embodiment minimum multiplier component 511 performs the 0.5 multiplication by implementing a 1 bit shift right. Absolute minimum subtractor component 512 subtracts 0.5Z from the total of |X| and |Y|, which produces the approximate distance Da on output 513.

In the embodiment shown in FIG. 5 there is a pixel rasterization rate of one pixel per clock. For two pixels per clock, the tables are transformed to dual-port form and the datapath's gate count are doubled. Once the distances between the samples in any given pixel and the circular disk center are established they must be sorted in order of magnitude according to which samples are closest to the image center.

In the present embodiment a sorting network is utilized to sort the distances of the samples in ascending order. The sorting network is comprised of input lines, sorting nodes and output lines. A pair of sample identifiers and their associated distances from the circular disk center are fed on the input lines into the sorting nodes which determine which of the samples is nearest the image center and which is farthest.

Figure 6:
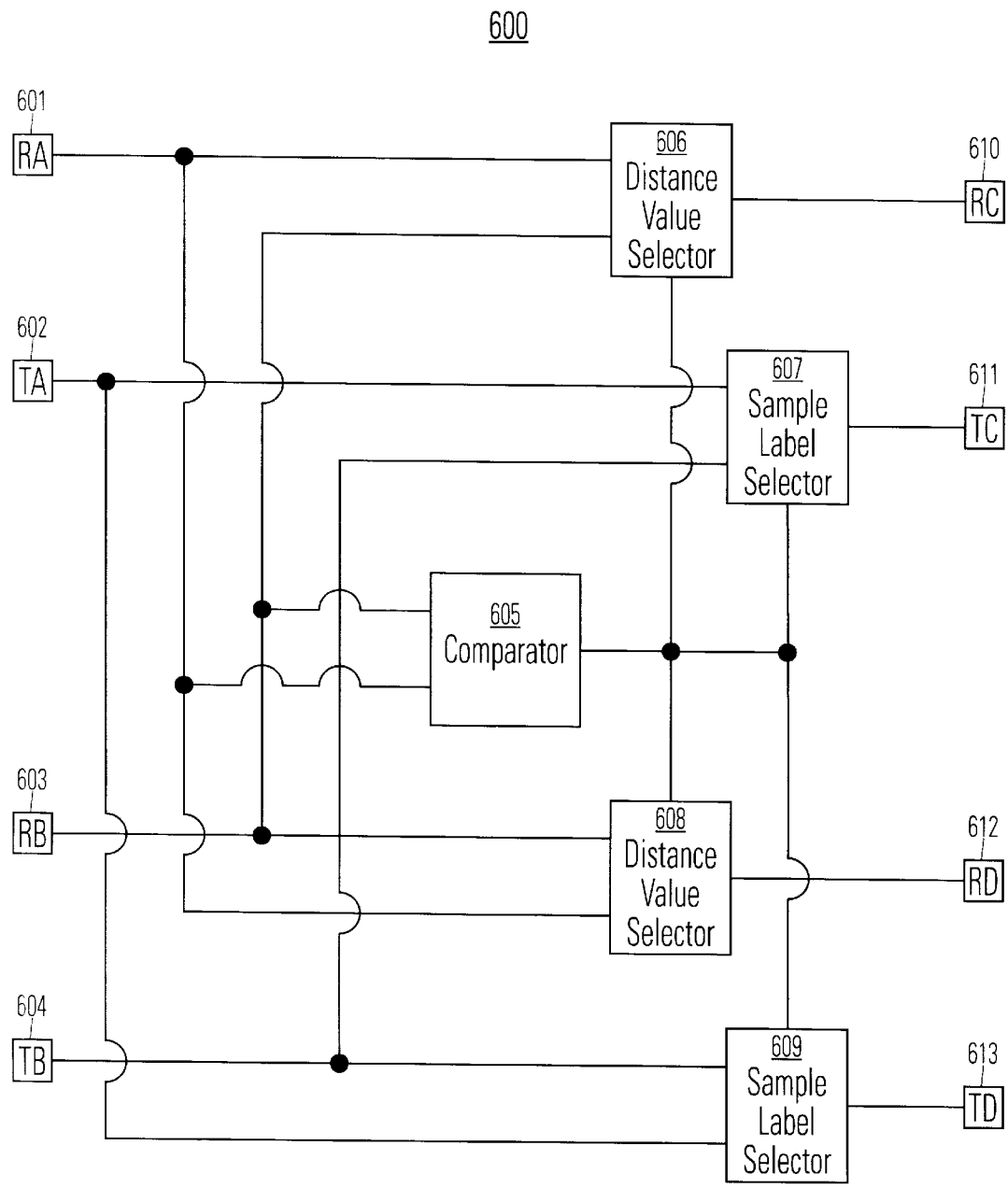
FIG. 6 shows a schematic diagram of a sorting node 600 in which the logic gates in a sample distance approximation computation are utilized for both computations based upon the center of an image.

FIG. 6 shows one embodiment of a sorting node 600. Sorting node 600 comprises input ports 601 through 604, comparator component 605, distance value selector components 606 and 608, sample label selector components 607 and 609, and output ports 610 through 613. In the present embodiment, the distance value selector components 606 and 608 and the sample label selector components 607 and 609 are multiplexers. The distance values and sample labels to be sorted are fed into the sorting node 600 through input ports 601 through 604. The distance values indicate the distance of a sample from a circular disk center and the sample labels identify the sample. The distance values are run through comparator component 605 which determines which distance value is greater. The results of comparator component 605 are fed into distance value selector components 606 and 608 and sample label selector components 607 and 609, which utilize the results to select which input shall appear on its output. The greater distance value and its sample label appear at the top two outputs (610 and 611) and lesser distance value and sample label appears at the bottom two outputs (612 and 613).

For example, in FIG. 6 sample A is being compared to sample B. RA is the distance value of sample A from a center of a circular disk and TA is the sample label. Similarly, RB is the value or sample distance of sample B from a center of a circular disk and TB is the sample label. The distance values RA and RB are fed into comparator component 605 which determines which distance value is greater and the results are fed into distance value selector components 606 and 608 and sample label selector components 607 and 609.

Distance value selector component 606 selects which of the values, RA or RB, is greater and cause it to appear on its output RC 610. Sample label selector component 607 selects which of the sample labels corresponds to the distance value selected by distance value selector 606 and causes the sample label to appear on output TC 611. Distance value selector 608 selects which of the distance values, RA or RB, is lesser and causes it to appear on its output RD. Sample label selector 609 selects which of the sample labels corresponds to the distance value selected by distance value selector 608 and causes the sample label to appear on output TD 613.

Figure 7:
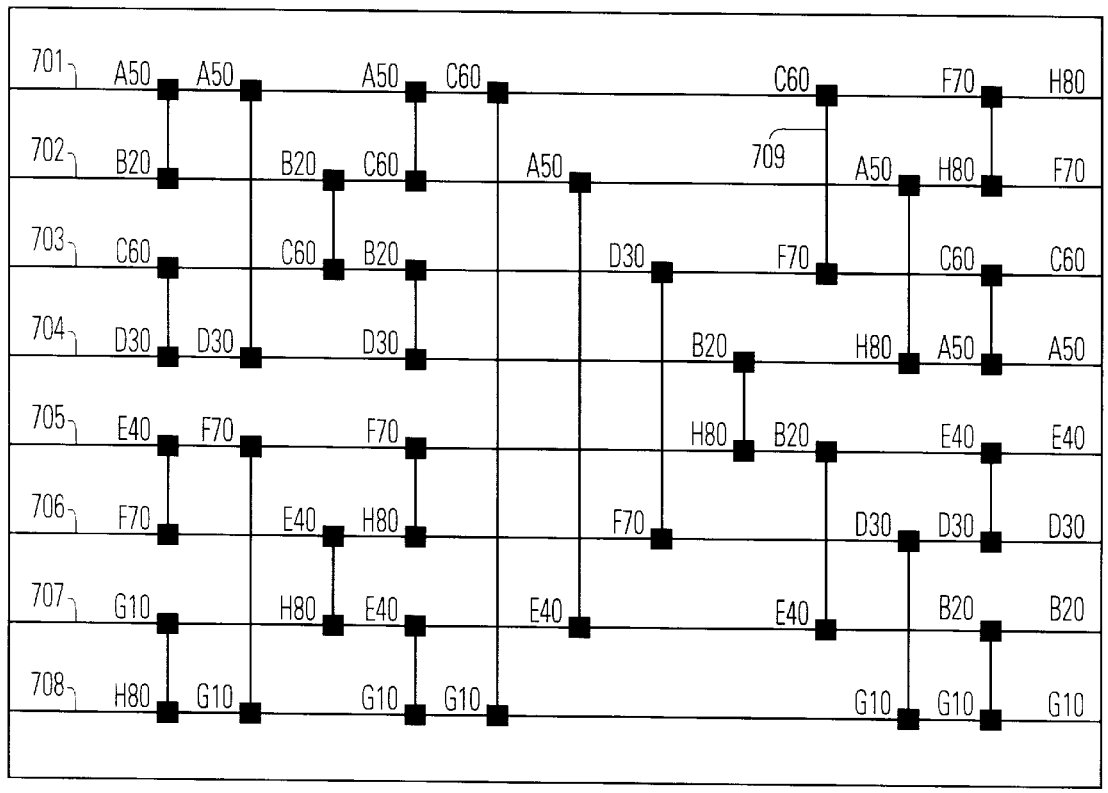
FIG. 7 shows a schematic of a sorting network 700 incorporated in the present embodiment.

FIG. 7 shows a schematic of a sorting network 700 incorporated in the present embodiment. Sorting network 700 comprises horizontal lines 701 through 708 coupled at sorting nodes. Each sorting node is represented by a vertical line coupled to a pair of horizontal lines, for example sorting node 709. In order not to unnecessarily obscure the invention, only one line is shown in sorting network 700 to represent both a sample label (e.g. A through H) and its corresponding distance value (e.g. 10 through 80). The sample labels and the corresponding distance values are fed into the sorting nodes on the horizontal lines. The sorting nodes then determine which distance value is greater. The greater distance value and its corresponding sample label appear on the top. outputs of the node and the lesser distance value and sample label appear on the bottom outputs of the node. When the distance values and sample labels have been processed all the way through the sorting network, from left to right, they appear in ascending order, with the distance value and corresponding sample label closest to the center circular disk on the bottom.

Once the samples have been arranged in a list according to ascending order, the number of samples in a given fragment needs to be determined. The number of samples in a fragment dictates which samples from the list will be included in the analysis. In the present embodiment the number of samples in a fragment is determined by utilizing a look up table.

Figure 8:
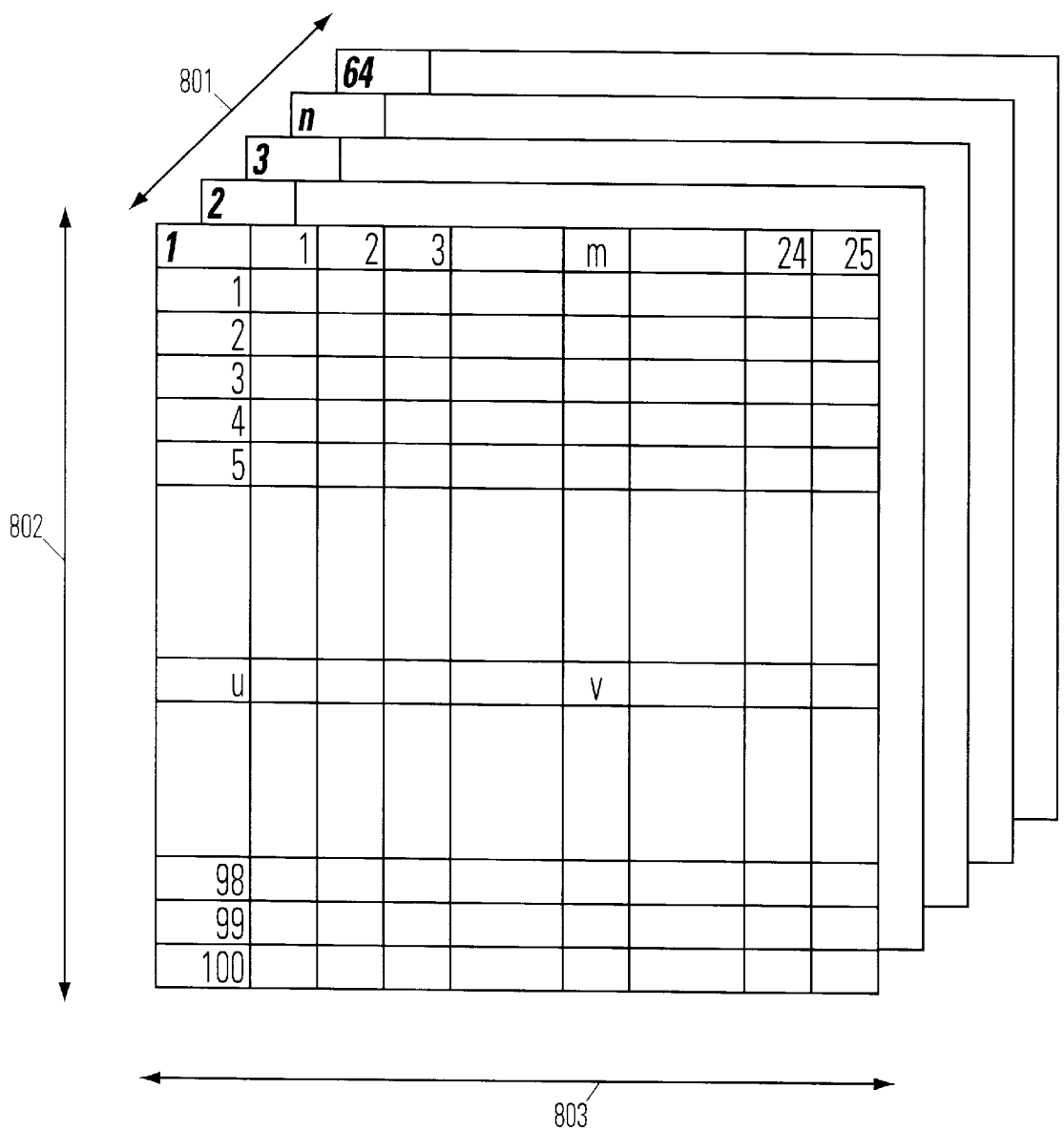
FIG. 8 depicts a representation of a 3D lookup table of the present embodiment.

FIG. 8 shows a set of lookup tables utilized in the present embodiment. The computer graphics system selects which look up table to use based upon the location of the image center. As indicated above there are 64 potential constant multisample image centers in any given pixel. Thus, there are 64 different lookup tables for any given pixel and these are shown along the 801 axis. The 802 axis indicates the circular disk size with a maximum of 100 samples. Since maximum radius of a circular disk in the present embodiment is 2 pixels the circular disk can be configured in a 5 by 5 pixel grid. A 5 by 5 pixel grid has 25 different pixels. Thus, the 803 axis indicates which of the 25 pixels is being analyzed. The values entered in the table indicate the number of samples that need to be analyzed or drawn in that pixel, with a potential maximum of 8 samples in any given pixel. The total table size is 640,000 bits (100 sample maximum times 64 center positions times 25 pixels times 4 bits). As a practical matter a 640,000 bit look up table set is relatively large. In the present embodiment it is preferable to utilize a compressed look up table set.

Figures 9A, 9B:
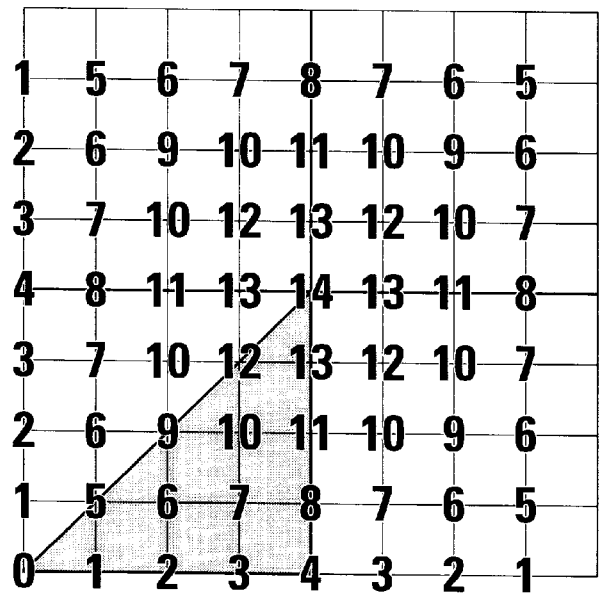
FIG. 9A shows an 8 multisample pixel with 64 potential sample positions.
FIG. 9B shows one embodiment of a delta compression entry.

In one embodiment, the compression is accomplished by taking advantage of the symmetrical nature of the multi-sampling within a pixel. FIG. 9A shows an 8 multisample pixel with 64 potential sample positions. From the potential sample position numbering system employed in FIG. 9A, it is evident the possible sample positions are symmetrical if the pixel is folded down on the horizontal axis (removing half the number of potential sample positions), then over on the vertical axis and then across the diagonal axis. With each fold half of the remaining potential sample positions are removed. When all the folding is complete there are only 15 distinct possible sample positions of the total 64 that are nontrivial, the remaining 49 are mirrored from the 15 nontrivial positions. Thus, only 15 lookup tables are needed.

There are multiple compression methods that are suitable for use with the present invention. For example, another embodiment utilizes a delta compression technique. Instead of specifying the fragment sample counts for different circular disk sizes (as the lookup table set in FIG. 8 did), the delta compression technique utilizes a single entry to represent the information. The entry is divided into fields. The number of fields is equal to the maximum number of samples per pixel.

FIG. 9B shows one embodiment of a delta compression entry. Each entry is divided into 8 fields since the present embodiment has a maximum of 8 samples per pixel. The first field is 7 bits and it indicates at what circular disk size the first sample in the pixel should be analyzed or drawn. Each of the next seven fields of 5 bits contains the difference in circular disk size when each additional sample should be analyzed or drawn. The resulting table size for the present embodiment of a 100 sample circular disk is 15,750 bits (15×25 (7+(7×5))).

Figure 10:
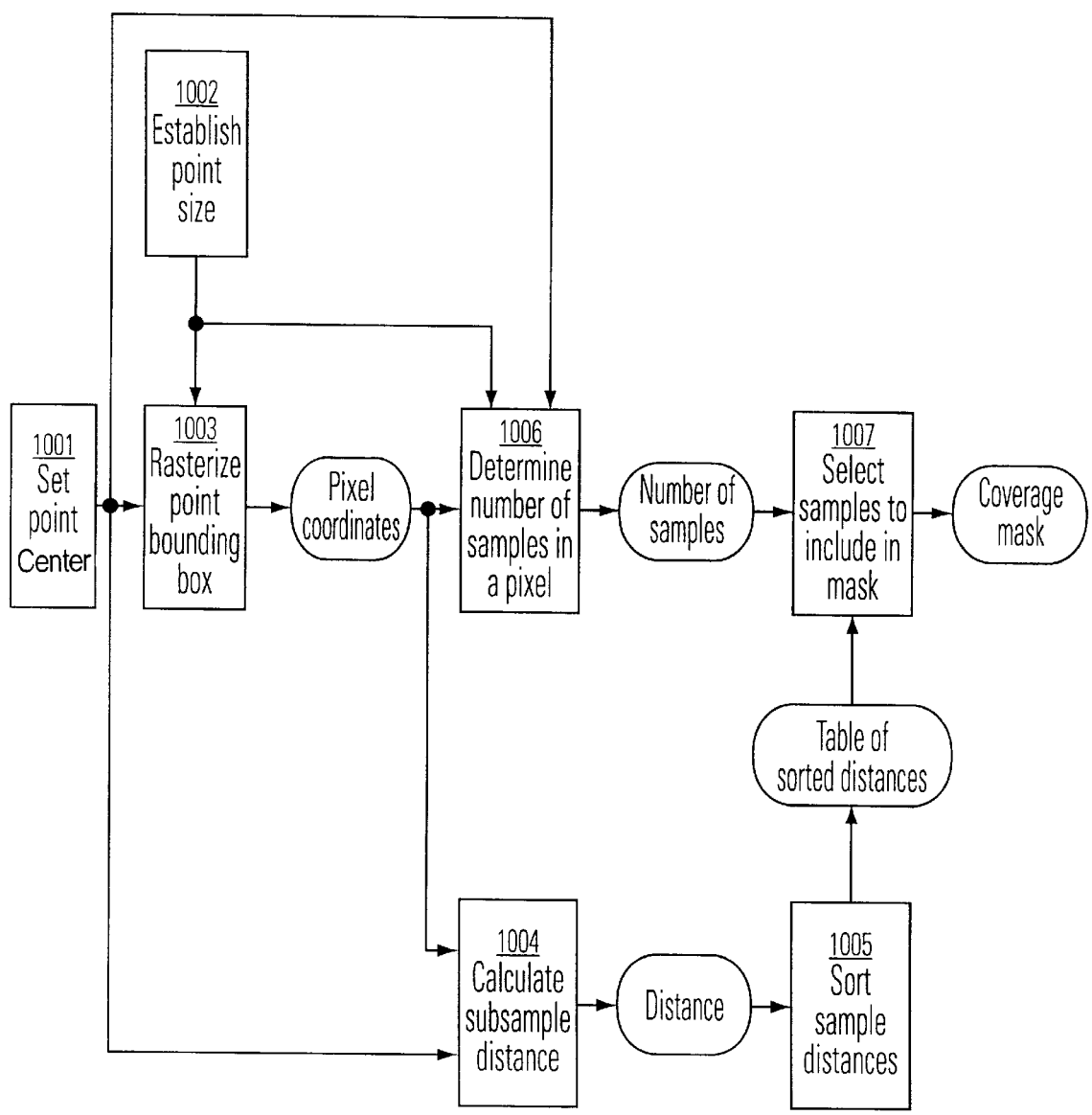
FIG. 10 is a flow chart of one embodiment of a constant multisample image coverage mask computer graphics process 1000.

FIG. 10 shows a block diagram of one embodiment of a constant multisample image coverage mask computer graphics process 1000. In the present embodiment, constant multisample image coverage mask computer graphics process 1000 is utilized to draw a circular disk. The circular disk is drawn in a 5 by 5 pixel grid with each pixel having a maximum of 8 samples per pixel.

In Step 1001 the center of a constant multisample image coverage mask is set. The location of the center of a constant multisample image coverage mask effectively establishes the location of the constant multisample image coverage mask in the pixel grid. The location of the center of a constant multisample image coverage mask is fed into Steps 1003, 1004 and 1006.

Step 1002 establishes the number of samples in a constant multisample image coverage mask. In the present embodiment, constant multisample image coverage mask computer graphics process 1000 is utilized to draw a circular disk containing 100 maximum samples. As indicated above the radius of the circular disk determines number of samples in the circular disk and circular disk size. The number of samples is fed into Steps 1003 and 1006.

In Step 1003 a bounding box is rasterized. Once the bounding box is established all the pixels containing potential fragments of the constant multisample image coverage mask are defined. The coordinates of the pixels containing fragments are forwarded to Steps 1004 and 1006.

Step 1004 calculates the distance of the samples from the center of the constant multisample image coverage mask. As indicated above, the present embodiment utilizes methods for approximating the distance from the sample to the center of a circular disk constant multisample coverage mask. The distance of the samples from the center of the circular disk constant multisample coverage mask are utilized in Step 1005.

Step 1005 sorts the samples in a table according to increased magnitude, with the shortest distances at the bottom of the table. In the present embodiment Step 1005 utilizes a sorting network to arrange the entries in the table. The table of sorted distances is sent to Step 1007.

In Step 1006 the number of samples to draw in a pixel is determined. In the present embodiment a look up table set is utilized to track the number of samples to draw in a pixel. The center of the constant multisample image coverage mask from Step 1001, the number of samples in the constant multisample image coverage mask from Step 1002 and the coordinates of the pixels containing fragments from Step 1003 indicate which cell in the look up table set contains the number of samples to draw in the pixel from Step 1003. The number of samples to draw in the pixel are utilized in Step 1007.

Step 1007 utilizes the number of samples in a pixel from Step 1006 and the table of sorted distances from Step 1005 to select which samples to include in a constant multisample image coverage mask. The present embodiment starts at the bottom of the table and selects the same number of samples as forwarded from Step 1006. These samples are used to define a constant multisample image coverage mask.

Thus, the present invention is a constant multisample process and system which is relatively inexpensive to implement, yet highly effective. It is a solution that uses less memory than prior art "multisample" processes and operates at a faster rate. The present computer graphics system provides excellent image quality while minimizing software and hardware requirements. Resulting constant multisample images have good definition and do not appear to flicker.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a computer graphics system, a system for generating a constant multisample image coverage mask, said system comprising:

a mask generator for generating a constant multisample image coverage mask;

an array of pixels in a coordinate system with perpendicular X and Y axes; said array of pixels is coupled to said mask generator;

a sample within said pixel, said sample includes information regarding an image; and a constant sample circuit adapted to maintain a constant number of samples associated with said constant multisample image coverage mask.

2. The computer graphics system of claim 1, wherein said constant sample circuit is adapted to examine a look up table comprising data that indicates a number of samples included in said constant multisample image coverage mask.

3. The computer graphics system of claim 2, wherein said look up table is a three dimensional table array that indicates a number of samples in a fragment, said three dimensional array includes a first dimension that corresponds to the location of said constant multisample image coverage mask center, a second dimension that corresponds to the total number of samples in said constant multisample image coverage mask, and a third dimension that corresponds to the location of the fragment.

4. The computer graphics system of claim 2, further comprising:

a compression method for compressing the data in said look up table.

5. The computer graphics system of claim 4, wherein potential constant multisample image coverage mask center locations are arranged in a symmetrical distribution in said pixel and said compression method is adapted to take advantage of the symmetrical nature of potential constant multisample image coverage mask center locations by folding about a symmetrical axis in the symmetrical distribution and eliminating trivial data.

6. The computer graphics system of claim 5, wherein said compression method is adapted to operate on a delta compression technique in which the look up table entries comprise a plurality of fields, one of said plurality of fields corresponds to a sample in a pixel and indicates a constant multisample image coverage mask size at which said sample should be included in said constant multisample image coverage mask.

7. The computer graphics system of claim 1, further comprising;
   a distance determination component adapted to determine a distance from a sample to the center of said constant multisample image coverage mask; and
   a sorting component adapted to sort the samples according to their distance from the center of said constant multisample image coverage mask.

8. The computer graphics system of claim 7, wherein said sorting component further comprises a sorting node adapted to sort values in order of magnitude.

9. The computer graphics system of claim 8, wherein said sorting node further comprises:
   an input port adapted to receive data representing distance values and sample labels;
   a comparator component coupled to said input port, said comparator component is adapted to determine which data representing distance values on said input port is greater;
   a distance value selector component coupled to said comparator component, said distance value selector component is adapted to select a distance value based upon which distance value said comparator component indicates is greater,
   a sample label selector component coupled to said comparator component, said sample label selector component is adapted to select a sample label based upon which distance value said comparator component indicates is greater; and
   an output port coupled to said distance value selector component and said sample label selector component, said output port is adapted to transmit results from said distance value selector component and said sample label selector component.

10. The computer graphics system of claim 9, wherein said sorting component further comprises a sorting network of a plurality of sorting nodes, said plurality of sorting nodes are coupled to each other such that a plurality of values are sorted according to their order of magnitude.

11. The computer graphics system of claim 7, wherein said distance determination component is adapted to derive an approximate distance from a distance metric measured parallel to a first axis and a distance metric measured parallel to a second axis of the coordinate system according to:

$$Da = |Xd| + |Yd| - 0.5Z$$

where:
   Da=the straight line distance of the sample from the circular disk center;
   Xd=the distance metric measured parallel to said first axis;
   Yd=the distance measured parallel to the vertical axis; and
   Z=the minimum ($|Xd|, |Yd|$).

12. The computer graphics system of claim 11, wherein said distance determination component further comprises;
   an input port, said input port adapted to receive data regarding the position of a constant multisample image coverage mask center and a sample,
   an input subtractor component coupled to said input ports, said input subtractor component is adapted to determine the difference between said data indicating the location of a constant multisample image coverage mask center and the position of a sample;
   an absolute value component coupled to said input subtractor component, said absolute value component is adapted to determine the absolute values of the difference in the constant multisample image coverage mask center location and the position of a sample;
   an adder component coupled to said absolute value component; said adder component is adapted to add the absolute values of the difference in the data indicating a constant multisample image coverage mask center location and the position of a sample;
   an absolute value comparator coupled to said absolute value component, said absolute value comparator is adapted to determine the minimum of the absolute values;
   a minimum multiplier component coupled to said absolute value comparator, said minimum multiplier component adapted to multiply the minimum of the absolute values by 0.5; and
   an absolute minimum subtractor component coupled to said minimum multiplier component and said adder component, said absolute minimum subtractor component adapted to subtract the results of said minimum multiplier component from said adder component; and
   an output coupled to said absolute minimum subtractor component, said output adapted to transmit the results of said absolute minimum subtractor component.

13. In a computer graphics system, a system for generating a constant multisample image coverage mask of a circular disk on an array of pixels, wherein each sample is associated with information regarding said constant multisample image coverage mask of a circular disk, said information being used by said computer graphics system to render said constant multisample image coverage mask of a circular disk on a pixel, said system comprising:
   a plurality of samples within a pixel, said plurality of samples per pixel is programmable;
   a constant sample component adapted to maintain a constant number of samples associated with a constant multisample image coverage mask of a circular disk;
   a distance determination component adapted to determine the distance from a sample to the center of said constant multisample image coverage mask of a circular disk; and
   a sorting component adapted to sort the samples according to their distance from the center of said constant multisample image coverage mask of a circular disk.

14. The computer graphics system of claim 13, wherein said constant sample component is adapted to examine a look up table set which indicates a number of samples in a fragment according to the location of the center of said constant multisample image coverage mask of a circular disk, the total number of samples in said constant multisample image coverage mask of a circular disk and the location of a fragment of said constant multisample image coverage mask of a circular disk.

15. The computer graphics system of claim 14, further comprising;
   a compression method for compressing the data in said look up table set, said compression method is adapted to take advantage of the symmetrical nature of sample data and operate on a delta compression technique, wherein the table entries comprise a number of fields equal to the maximum number of samples per pixel.

16. The computer graphics system of claim 13, wherein said distance determination component further comprises;
   an input port, said input port adapted to receive data indicating the center of said constant multisample image coverage mask of a circular disk and the position of a sample in said constant multisample image coverage mask of a circular disk,
   an input selector component coupled to said input ports, said input selector component adapted to select whether inputs related to the center of said constant multisample image coverage mask of a circular disk will be processed;
   an input subtractor component coupled to said input selector component, said input subtractor component is adapted to determine the difference between said data indicating the location of the constant multisample image coverage mask of a constant multisample image coverage mask of a circular disk center and the position of a sample;
   an absolute value component coupled to said input subtractor component, said absolute value component is adapted to determine the absolute values of the difference in the data indicating the location of a reference circular disk and the position of a sample;
   an adder component coupled to said absolute value component; said adder component is adapted to add the absolute values of the difference in the data indicating the location of a constant multisample image coverage mask of a circular disk and the position of a sample;
   an absolute value comparator coupled to said absolute value component, said absolute value comparator is adapted to determine the minimum of the absolute values;
   a minimum multiplier component coupled to said absolute value comparator, said minimum multiplier component adapted to multiply the minimum of the absolute values by 0.5; and
   an absolute minimum subtractor component coupled to said minimum multiplier component and said adder component, said absolute minimum subtractor adapted to subtract the results of said minimum multiplier component from said adder component; and
   an output coupled to said absolute minimum subtractor component, said output adapted to transmit the results of said absolute minimum subtractor component.

17. In a computer graphics system, a process for generating a constant multisample image coverage mask on an array of pixels that contain samples associated with information regarding said constant multisample image coverage mask, wherein the array of pixels is coupled to a coordinate system with perpendicular X and Y axes, said process comprising the steps of:
   a) setting a constant multisample image coverage mask center location;
   b) establishing a number of samples comprising said constant multisample image coverage mask;
   c) rasterizing a constant multisample image coverage mask bounding box;
   d) determining a distance from the constant multisample image coverage mask center to a sample;
   e) sorting samples according to the magnitude of their corresponding distances from the constant multisample image coverage mask center to a sample;
   f) deciding the number of samples in a pixel to include in said constant multisample image coverage mask; and
   g) selecting samples to include in said constant multisample image coverage mask.

18. The process of claim 17 wherein the step d) further includes the step of:
   d1) calculating the distance from the constant multisample image coverage mask center to a sample in accordance with:

$$d=|Xd|+|Yd|-0.5Z$$

where:
   d=the straight line distance of the sample from the circular disk center;
   Xd=the distance component measured parallel to the X axis;
   Yd=the distance component measured parallel to the Y axis; and
   Z=the minimum ($|Xd|$, $|Yd|$).

19. The process of claim 17 wherein the step e) further comprises the steps of:
   e1 comparing two different samples and their corresponding distance from the constant multisample image coverage mask center to a sample;
   e2 inserting a sample farther from the constant multisample image coverage mask center higher in a list relative to the sample closer to constant multisample image coverage mask center.

20. The process of claim 17 wherein the step f) further comprises the steps of:
   f1 examining a lookup table set that specifies the number of samples in a fragment according to the location of the constant multisample image coverage mask center, the total number of samples in said constant multisample image coverage mask and the location of a fragment in said constant multisample image coverage mask.

* * * * *